US011369094B1

(12) United States Patent
Wann, Jr.

(10) Patent No.: US 11,369,094 B1
(45) Date of Patent: Jun. 28, 2022

(54) AUTOMATIC CALCIUM REACTOR

(71) Applicant: William H. Wann, Jr., Bristol, WI (US)

(72) Inventor: William H. Wann, Jr., Bristol, WI (US)

( * ) Notice: Subject to any disclaimer, the term of this patent is extended or adjusted under 35 U.S.C. 154(b) by 640 days.

(21) Appl. No.: 16/427,385

(22) Filed: May 31, 2019

(51) Int. Cl.
| | |
|---|---|
| *A01K 63/04* | (2006.01) |
| *B01J 19/00* | (2006.01) |
| *B01F 23/232* | (2022.01) |
| *B01F 25/312* | (2022.01) |
| *B01F 101/48* | (2022.01) |

(52) U.S. Cl.
CPC ............ *A01K 63/04* (2013.01); *B01F 23/232* (2022.01); *B01F 25/312* (2022.01); *B01J 19/0006* (2013.01); *B01F 2101/48* (2022.01)

(58) Field of Classification Search
CPC ..... A01K 63/04; B01F 23/232; B01F 25/312; B01F 2101/48; B01J 19/0006
USPC ................................................. 422/106, 239
See application file for complete search history.

(56) References Cited

U.S. PATENT DOCUMENTS

| | | | | |
|---|---|---|---|---|
| 2,985,514 A | * | 5/1961 | Lundeen | B01F 21/20 422/240 |
| 3,190,726 A | * | 6/1965 | Rudelick | C02F 1/42 137/391 |
| 3,202,174 A | * | 8/1965 | Rudelick | F16K 31/22 210/123 |
| 6,244,219 B1 | * | 6/2001 | Krum | A01K 63/04 119/268 |
| 7,442,306 B2 | * | 10/2008 | Olivier | B01F 25/50 210/764 |
| 7,736,496 B2 | * | 6/2010 | DeGiacomo | A01K 63/047 119/268 |
| 7,886,696 B2 | * | 2/2011 | Marks | A01K 63/045 119/248 |
| 11,179,689 B1 | * | 11/2021 | Chen | B01J 4/02 |

FOREIGN PATENT DOCUMENTS

| | | | |
|---|---|---|---|
| CN | 2930276 Y | * | 8/2007 |
| CN | 201039704 Y | * | 3/2008 |
| CN | 206680238 U | * | 11/2017 |

* cited by examiner

*Primary Examiner* — Charles S Bushey
(74) *Attorney, Agent, or Firm* — Donald J. Ersler

(57) ABSTRACT

An automatic calcium reactor preferably includes a reactor body, a carbon dioxide separator, a salt water pump, a recycling venturi and an electronic controller. The reactor body includes a lower chamber and an upper chamber. A source of calcium is placed in the upper chamber. The carbon dioxide separator is suspended near a top of the upper chamber. A salt water outlet is formed through a side wall of the reactor body. Salt water from the aquarium and salt water from the reactor body are fed into the salt water pump. A recycling venturi includes a salt water inlet, a carbon dioxide inlet and an outlet, which is connected to the lower chamber. A float switch is retained near a top of the upper chamber. Rising salt water inside the upper chamber trips the float switch and opens the carbon dioxide valve through the electronic controller.

20 Claims, 2 Drawing Sheets

AUTOMATIC CALCIUM REACTOR

BACKGROUND OF THE INVENTION

1. Field of the Invention

The present invention relates generally to aquariums and more specifically to an automatic calcium reactor, which is used to supply calcium and alkalinity to a reef aquarium.

2. Discussion of the Prior Art

A calcium reactor is used to supply calcium and alkalinity to a reef aquarium by using carbon dioxide to dissolve a calcium based media such as dead coral skeletons or calcium carbonate. The calcium reactor is filled with calcium media in which aquarium salt water is pumped. Carbon dioxide is injected into the calcium reactor, which creates carbonic acid and thus lowers the ph inside of the reactor allowing the media to dissolve into the salt water and replenish the calcium in the aquarium.

Nearly all calcium reactors on the market utilizes a bubble counter or a PH controller to maintain the proper flow of carbon dioxide into the calcium reactor. The prior art calcium reactors also use some type of needle valve or pump to control the flow of salt water through the prior art calcium reactor.

Accordingly, there is a clearly felt need in the art for an automatic calcium reactor, which utilizes a float switch to control the flow of carbon dioxide gas in to a calcium reactor, and an electronic controller in conjunction with a valve to control on time and off timer in a repeat cycle to fine tune the amount of calcium and alkalinity in the aquarium.

SUMMARY OF THE INVENTION

The present invention provides an automatic calcium reactor, which is used to supply calcium and alkalinity to a reef aquarium. The automatic calcium reactor preferably includes a reactor body, a carbon dioxide separator, a salt water pump, a recycling venturi and an electronic controller. The reactor body includes a lower chamber, an upper chamber and a reactor cap. A diffuser separates the lower chamber from the upper chamber. The diffuser includes a plurality of openings. A source of calcium, such as coral skeletons or calcium carbonate is placed in the upper chamber by removing the removable cap. The carbon dioxide separator is suspended near a top of the upper chamber with a water tube. The carbon dioxide separator separates carbon dioxide gas from salt water in the upper chamber. The salt water exiting the upper chamber through the carbon dioxide separator is fed back into an aquarium through a salt water valve. A carbon dioxide outlet is formed through a top of the reactor cap.

The salt water pump includes inlets for salt water from the aquarium and salt water from a salt water outlet formed through a side wall of the reactor body. The salt water pump is always powered. A recycling venturi includes a salt water inlet and a carbon dioxide inlet. The salt water inlet of the recycling venturi receives salt water from an outlet of the salt water pump. The carbon dioxide inlet of the recycling venturi receives carbon dioxide gas from the carbon dioxide outlet on the top of the reactor cap, which is supplied by a carbon dioxide tank through a carbon dioxide valve. The salt water valve and the carbon dioxide valve are preferably solenoid valves. However, other types of electronically actuated valves may also be used.

An outlet of the recycling venturi is connected to an inlet of the lower chamber of the reactor body. A float switch is retained near a top of the reactor cap. Rising salt water inside the upper chamber will trip the float switch. However, any suitable type of float switch may be used, such as mechanical, optical or ultrasonic. The salt water valve and carbon dioxide valve are connected to the electronic controller. The electronic controller opens the carbon dioxide valve, when the float switch is activated, because of the rising salt water in the reactor body. The electronic controller includes a timer. The opening and closing of the salt water valve is controlled by the timer. The electronic controller allows a user to set the on time and off time in a repeat cycle for the salt water valve to fine tune the amount of calcium and alkalinity in the aquarium.

Accordingly, it is an object of the present invention to provide an automatic calcium reactor, which utilizes a float switch to control the flow of carbon dioxide gas into an aquarium.

Finally, it is another object of the present invention to provide an automatic calcium reactor, which utilizes an electronic controller in conjunction with a valve to control on time and off time in a repeat cycle to fine tune the amount of calcium and alkalinity in the aquarium.

These and additional objects, advantages, features and benefits of the present invention will become apparent from the following specification.

DETAILED DESCRIPTION OF THE PREFERRED EMBODIMENTS

Figure 1:
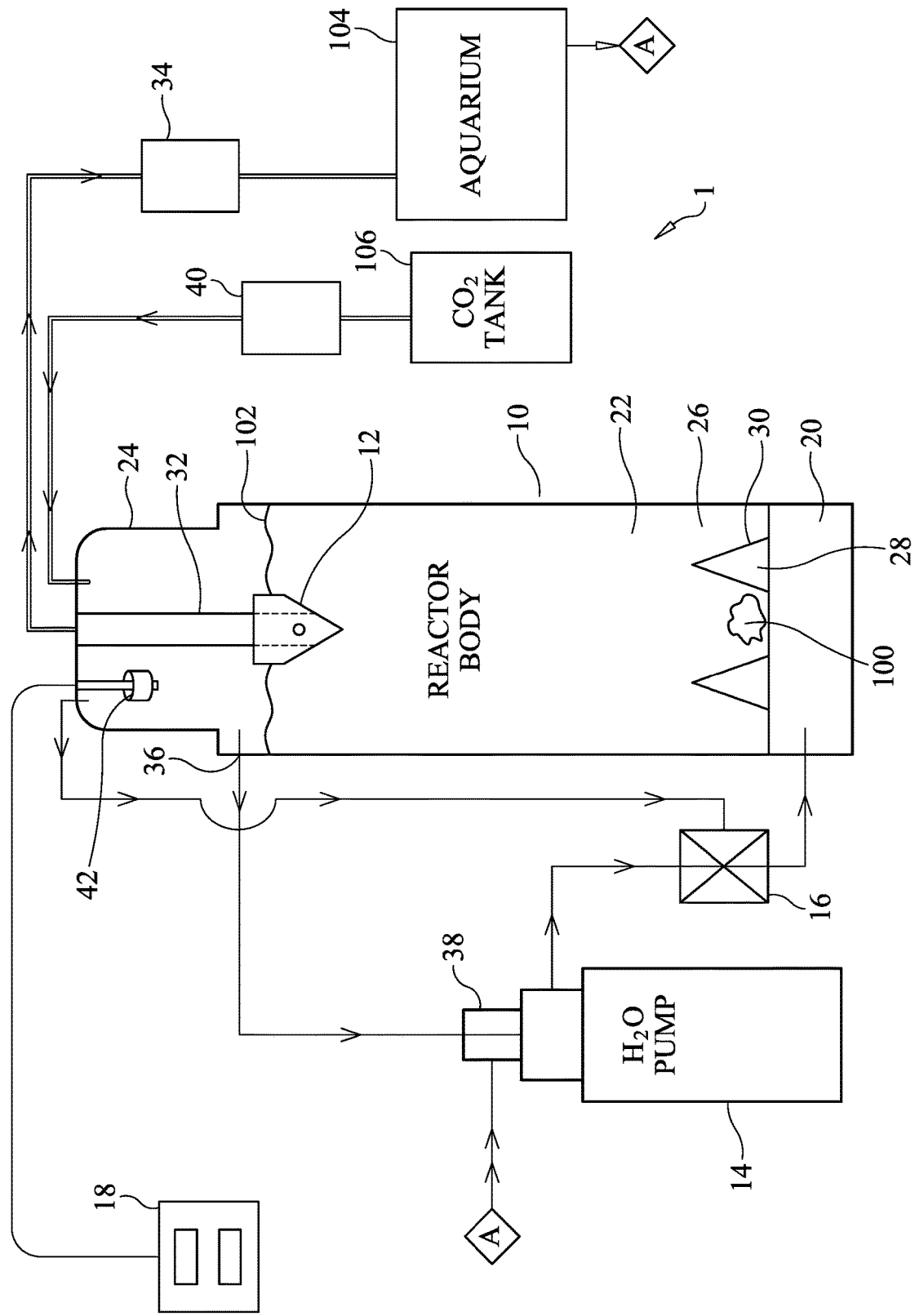
FIG. 1 is a mechanical schematic diagram of an automatic calcium reactor in accordance with the present invention.

With reference now to the drawings, and particularly to FIG. 1, there is shown a mechanical schematic diagram of an automatic calcium reactor 1. The automatic calcium reactor 1 preferably includes a reactor body 10, a carbon dioxide separator 12, a salt water pump 14, a recycling venturi 16 and an electronic controller 18. The reactor body 10 includes a lower chamber 20, an upper chamber 22 and a reactor cap 24. A diffuser 26 separates the lower chamber 20 from the upper chamber 22. The diffuser 26 preferably includes a base plate 28 and a plurality of cones 30 extending upward from said base plate 28. A plurality of slits or openings are formed through the plurality cones 30 to allow salt water to transfer from the lower chamber 20 to the upper chamber 22. A source of calcium 100, such as coral skeletons or calcium carbonate is placed in the upper chamber 22 by removing the reactor cap 24. The carbon dioxide separator 12 is suspended near a top of the upper chamber 22 with a water tube 32. The carbon dioxide separator 12 separates carbon dioxide gas from salt water in the upper chamber 22. The salt water 102 exiting the upper chamber 22 through the carbon dioxide separator 12 is feed back into an aquarium 104 through a salt water valve 34. A carbon dioxide outlet is formed through a top of the reactor cap 24, above the carbon dioxide separator 12.

A pump inlet 38 includes inlets for salt water from the aquarium 104 and salt water from the salt water outlet 36 in a side wall of the reactor body 10. The salt water pump 14 is always powered or operating. The recycling venturi 16 includes a salt water inlet and a carbon dioxide inlet. The salt water inlet of the recycling venturi 16 receives salt water from an outlet of the salt water pump 14. The carbon dioxide inlet of the recycling venturi 16 receives carbon dioxide gas from a carbon dioxide outlet at a top of the reactor cap 24. Carbon dioxide gas is introduced into the reactor body 10 through an inlet in the reactor cap 24 from a carbon dioxide tank 106 through a carbon dioxide valve 40. The salt water valve 34 and the carbon dioxide valve 40 are preferably solenoid valves. However, other types of electronically actuated valves may also be used. An outlet of the recycling venturi 16 is connected to an inlet of the lower chamber 20 of the reactor body 10.

Figure 2:
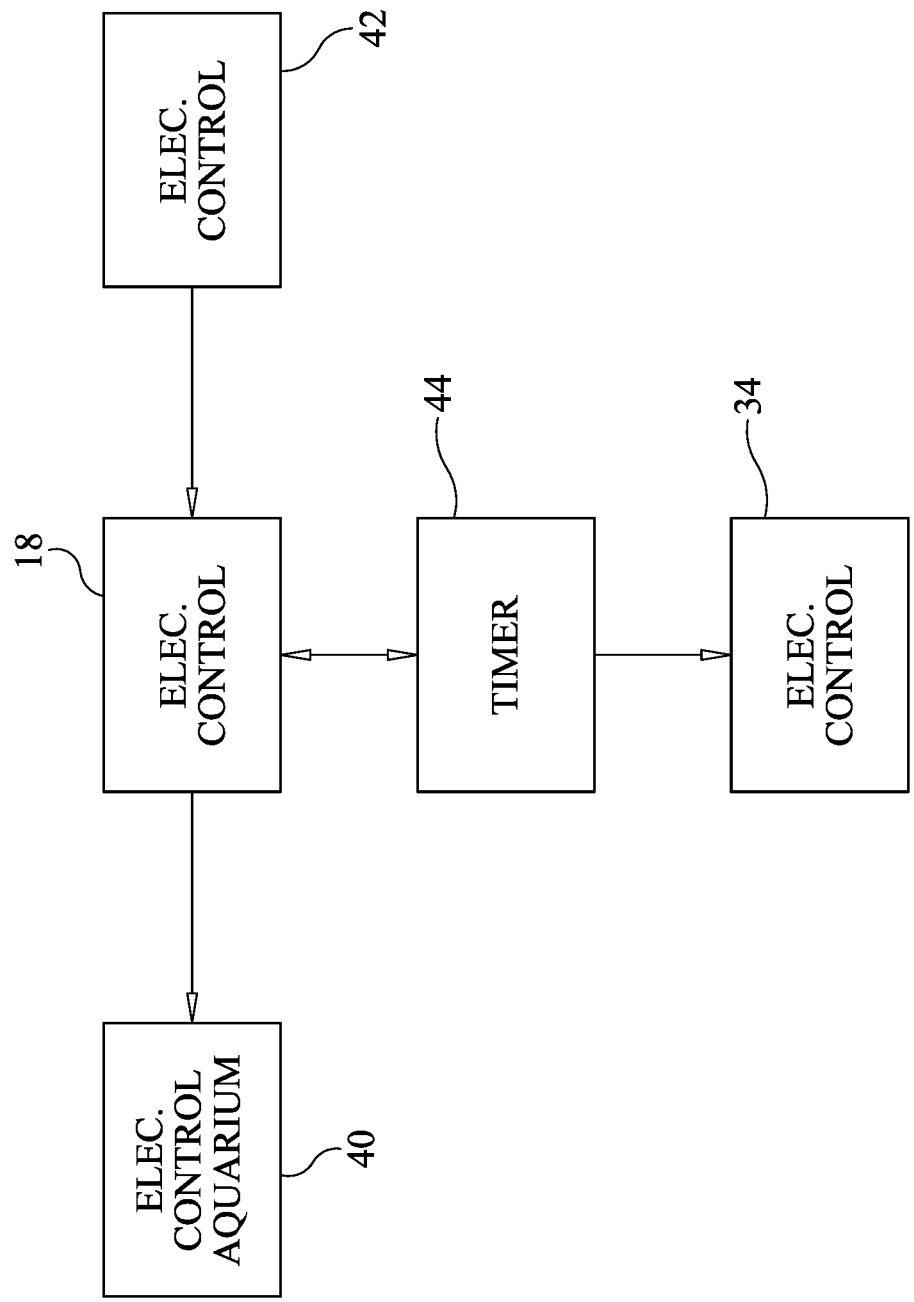
FIG. 2 is an electrical schematic diagram of an automatic calcium reactor in accordance with the present invention.

A float switch 42 is retained near a top of the reactor cap 24. Rising salt water 102 inside the upper chamber 22 will trip the float switch 42. Any suitable type of float switch may be used, such as mechanical, optical or ultrasonic. With reference to FIG. 2, the salt water valve 34 and the carbon dioxide valve 40 are connected to the electronic controller 18. The electronic controller 18 opens the carbon dioxide valve 40, when the float switch 42 is activated, because of the rising salt water 102 in the reactor body 10. The electronic controller 18 includes a timer 44. The opening and closing of the salt water valve 34 is controlled by the timer 44. However a programmable timer may also be used instead of an electric controller 18 and timer 44 combination. The electronic controller 18 allows a user to set the on time and off time in a repeat cycle of the salt water valve 34 to fine tune the amount of calcium and alkalinity in the aquarium 104.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An automatic calcium reactor comprising:
   a reactor body capable of retaining a source of calcium;
   a float switch is located inside said reactor body near a top of said reactor body;
   a carbon dioxide valve controls the flow of carbon dioxide gas into said reactor body from a source of carbon dioxide gas; and
   an electronic controller is connected to said float switch, wherein said carbon dioxide valve is opened when said float switch is activated by a rising level of salt water in said reactor body.

2. The automatic calcium reactor of claim 1, further comprising:
   a diffuser is formed in substantially a bottom of said reactor body, said diffuser creates a lower chamber and an upper chamber.

3. The automatic calcium reactor of claim 2, further comprising:
   a carbon dioxide separator is formed near a top of said reactor body, wherein said carbon dioxide separator separates carbon dioxide from salt water.

4. The automatic calcium reactor of claim 3 wherein:
   a salt water outlet is formed through a side wall of said reactor body above said carbon dioxide separator.

5. The automatic calcium reactor of claim 2, further comprising:
   a recycling venturi for combining salt water with carbon dioxide gas for input into said lower chamber.

6. The automatic calcium reactor of claim 5, further comprising:
   a salt water pump for pumping salt water into said recycling venturi.

7. The automatic calcium reactor of claim 2 wherein:
   said diffuser includes a base plate and a plurality of cones extending upward from said base plate, a plurality of openings are formed in said plurality of cones.

8. An automatic calcium reactor comprising:
   a reactor body capable of retaining a source of calcium;
   a carbon dioxide separator is located inside said reactor body, said carbon dioxide separator extracts salt water from said reactor body;
   a salt water valve is coupled to said carbon dioxide separator; and
   a programmable timer is connected to said salt water valve, wherein said programmable timer controls on time and off timer in a repeat cycle on said salt water valve to fine tune the amount of calcium and alkalinity in an aquarium.

9. The automatic calcium reactor of claim 8, further comprising:
   a diffuser is formed in substantially a bottom of said reactor body, said diffuser creates a lower chamber and an upper chamber.

10. The automatic calcium reactor of claim 8 wherein:
    a salt water outlet is formed through a side wall of said reactor body above said carbon dioxide separator.

11. The automatic calcium reactor of claim 9, further comprising:
    a recycling venturi for combining salt water with carbon dioxide gas for input into said lower chamber.

12. The automatic calcium reactor of claim 11, further comprising:
    a salt water pump for pumping salt water into said recycling venturi.

13. The automatic calcium reactor of claim 8, further comprising:
    a reactor cap is retained on a top of said reactor body.

14. The automatic calcium reactor of claim 9 wherein:
    said diffuser includes a base plate and a plurality of cones extending upward from said base plate, a plurality of openings are formed in said plurality of cones.

15. An automatic calcium reactor comprising:
    a reactor body capable of retaining a source of calcium;
    a float switch is located inside said reactor body near a top of said reactor body;
    a carbon dioxide valve controls the flow of carbon dioxide gas into said reactor body from a source of carbon dioxide gas;
    an electronic controller is connected to said float switch, said electronic controller includes a timer, wherein said carbon dioxide valve is opened when said float switch is activated by a rising level of salt water in said reactor body;
    a carbon dioxide separator is located inside said reactor body, said carbon dioxide separator extracts salt water from said reactor body; and
    a salt water valve is coupled to said carbon dioxide separator, wherein said timer controls on time and off timer in a repeat cycle on said salt water valve to fine tune the amount of calcium and alkalinity in an aquarium.

16. The automatic calcium reactor of claim 15, further comprising:
    a diffuser is formed in substantially a bottom of said reactor body, said diffuser creates a lower chamber and an upper chamber.

17. The automatic calcium reactor of claim 14 wherein:
a salt water outlet is formed through a side wall of said reactor body above said carbon dioxide separator.

18. The automatic calcium reactor of claim 16, further comprising:
a recycling venturi for combining salt water with carbon dioxide gas for input into said lower chamber.

19. The automatic calcium reactor of claim 18, further comprising:
a salt water pump for pumping salt water into said recycling venturi.

20. The automatic calcium reactor of claim 16 wherein:
said diffuser includes a base plate and a plurality of cones extending upward from said base plate, a plurality of openings are formed in said plurality of cones.

* * * * *